J. F. HENRY.
STOVE LID.
APPLICATION FILED APR. 4, 1914.
1,141,058.
Patented May 25, 1915.
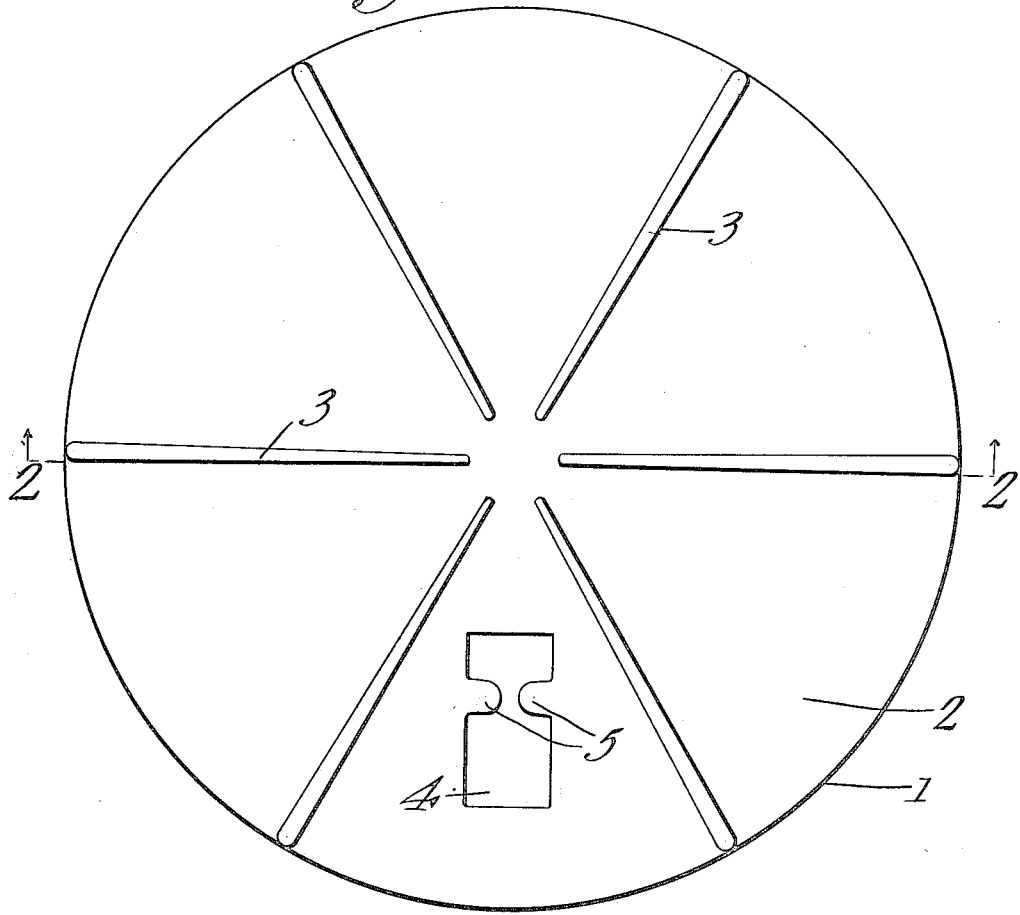
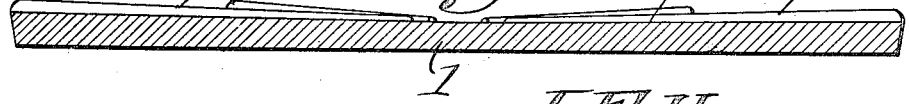
Witnesses
J. F. Henry, Inventor
by Attorneys

UNITED STATES PATENT OFFICE.

JOHN F. HENRY, OF VERSAILLES, ILLINOIS.

STOVE-LID.

1,141,058.

Specification of Letters Patent.

Patented May 25, 1915.

Application filed April 4, 1914. Serial No. 829,613.

*To all whom it may concern:*

Be it known that I, JOHN F. HENRY, a citizen of the United States, residing at Versailles, in the county of Brown and State of Illinois, have invented a new and useful Stove-Lid, of which the following is a specification.

The present invention appertains to stove lids, and aims to provide a novel and improved lid structure for stoves and the like.

It is the object of the present invention to provide a stove lid of such unique construction, that the tendency thereof to burn through, will be reduced to a minimum.

Another object of the present invention is to provide a stove lid having its upper surface or top so fashioned, as to provide an air space or gap between the lid and a vessel or cooking utensil placed over the lid, whereby the air may circulate under the vessel or utensil and over the lid, for assisting in reducing the tendency for the lid to burn through, to a minimum.

The present invention also comprehends the provision of a stove lid of the nature indicated wherein provision is made for spacing the vessels or utensils more or less from the upper surface or top of the lid, proportional to the size or diameter of the vessels, whereby the smaller vessels may be disposed relatively close to the lid, while the larger vessels, which cover a greater or the entire area of the lid, may be spaced to a relatively large distance from the center of the lid.

It is also the object of the present invention to provide a stove lid including the features above indicated, and wherein means will be provided for centering the cooking vessels or utensils upon the lid.

It is also within the scope of the present invention, to provide a stove lid having the characteristics above noted, and which will be of simple, unencumbered and inexpensive construction, which may be readily molded or cast in the usual manner, and which will be convenient, practical, serviceable, and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein—

Figure 1 is a plan view of the improved stove lid. Fig. 2 is a sectional view taken on the line 2—2 of Fig. 1.

The improved stove lid 1, is preferably in the form of a casting, as usual, and has its upper surface 2 concaved or dished, in order that the upper surface or top of the lid will slope from its periphery or margin, to the center. The top or upper surface of the lid is formed with a plurality of radial ribs 3, the inner ends of which terminate short of, but adjacent the center of the lid, while the outer ends of the ribs extend to the periphery or margin of the lid. The ribs 3 are tapered from their outer to their inner ends, both in width and height, whereby the ribs increase in height from their inner to their outer ends, corresponding to the inclination of the top or upper surface of the lid from the center of the lid to the periphery. The lid 1 is preferably provided with an upwardly opening socket 4 for the reception of an ordinary lifter, lugs 5 projecting over the socket 4 to receive the lifter thereinunder, whereby the lid may be readily manipulated, as usual, for applying and removing the lid.

In the use of the present lid, when the same is applied to the top of the stove, in the usual manner, and when a cooking vessel or utensil is seated upon the lid, the ribs 3 will space the vessel or utensil above the upper surface or top of the lid, to create an air space or gap between the vessel and lid. The heated air may thus circulate under the cooking vessel, and as a result of the circulation of air between the vessel and lid, the tendency for the lid to burn through, will be reduced to a minimum.

Due to the formation of the top of the lid and the ribs 3, it will be observed that the inward slope of the ribs, will tend to center the cooking vessel or utensil upon the lid, which is desirable, and furthermore, when smaller vessels are placed upon the inner portions of the ribs 3, they will be disposed relatively close to the lid, while larger vessels being seated upon the outer end portions of the ribs, will be spaced farther from the lid. This is of advantage, inasmuch as the smaller vessels may be heated effectively, without the intervention of a large space between the vessel and lid, which would be detrimental, while with the larger vessels, the greater space between the vessel and lid is essential.

Particular attention is directed to the fact that the lid in having an upper dished surface and a lower flat surface, will be thinner at its central portion than at its marginal portion, in order that the heat will penetrate the central portion of the lid more readily than around the marginal portion, and due to the dishing of the upper surface of the lid, and the inward taper of the ribs, a vessel seated upon the ribs will have the central portion of its bottom spaced farther from the center of the lid than the marginal portion of the bottom of the vessel is spaced from the lid. Thus, when a relatively large vessel is seated upon the ribs 3, so as to cover up the entire or greater portion of the area of the lid, the space or gap between the center of the lid and bottom of the vessel will be relatively large, whereas if a smaller vessel is seated upon the ribs, the bottom of the smaller vessel will lie closer to the center of the lid. Attention is also directed to the fact that due to the dishing of the upper surface of the lid and the inclination of the ribs, the spaces between the margin of the bottom of the vessel and the lid will be much narrower than the space between the center of the bottom of the vessel and the center of the lid, and this will provide an effective air circulating chamber below the bottom of the vessel, in which the heated air may circulate before being discharged from below the margin of the bottom of the vessel. Since the rim or periphery of the bottom of the vessel will always lie closer to the lid than the central portion of the bottom of the vessel, the bottom of the vessel will be heated with approximate uniformity throughout its area. The ribs 3 will also serve to strengthen or reinforce the lid, the ribs being integral therewith, and it being noted that the inner ends of the ribs terminating short of the center of the lid, will establish communication between the sectoral-shaped spaces between the several ribs, when a vessel is placed thereon.

From the foregoing, taken in connection with the drawing, the salient features of the present invention will be obvious to those versed in the art, without further comment being necessary, it being noted that the objects aimed at have been carried out satisfactorily by the provision of the peculiar lid herein disclosed.

Having thus described the invention, what is claimed as new is:—

A stove lid having an upper dished surface and upper radial ribs, the ribs increasing in height from their inner to their outer ends, and the central portion of the lid being thinner than its marginal portion, as and for the purposes specified.

In testimony that I claim the foregoing as my own, I have hereto affixed my signature in the presence of two witnesses.

JOHN F. HENRY.

Witnesses:
  BERTHA BARKER,
  MARY E. HENRY.

Copies of this patent may be obtained for five cents each, by addressing the "Commissioner of Patents, Washington, D. C."